US012767165B2

(12) United States Patent
Zhu et al.

(10) Patent No.: US 12,767,165 B2
(45) Date of Patent: Oct. 20, 2026

(54) VEHICLE DISTANCE REMINDER SYSTEM, VEHICLE DISTANCE REMINDER METHOD, STORAGE MEDIUM, AND VEHICLE

(71) Applicant: Faurecia Clarion Electronics (Xiamen) Co., Ltd., Xiamen (CN)

(72) Inventors: Fubin Zhu, Xiamen (CN); Hengqiang Zhang, Xiamen (CN)

(73) Assignee: Faurecia Clarion Electronics (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 19/283,360

(22) Filed: Jul. 29, 2025

(65) Prior Publication Data

US 2026/0035004 A1 Feb. 5, 2026

(30) Foreign Application Priority Data

Aug. 2, 2024 (CN) ........................ 202411059829.9

(51) Int. Cl.
*B60W 50/14* (2020.01)
*B60K 35/28* (2024.01)

(52) U.S. Cl.
CPC ............ *B60W 50/14* (2013.01); *B60K 35/28* (2024.01); *B60K 2360/117* (2024.01); *B60K 2360/171* (2024.01); *B60K 2360/179* (2024.01); *B60K 2360/1868* (2024.01); *B60K 2360/188* (2024.01); *B60K 2360/779* (2024.01); *B60W 2050/146* (2013.01); *B60W 2554/80* (2020.02)

(58) Field of Classification Search
None
See application file for complete search history.

(56) References Cited

U.S. PATENT DOCUMENTS

| | | | | |
|---|---|---|---|---|
| 8,676,431 B1 * | 3/2014 | Mariet | ................. | G05D 1/0238 701/28 |
| 9,280,901 B2 * | 3/2016 | Chen | ...................... | G08G 1/167 |
| 2013/0293370 A1 * | 11/2013 | Nakamichi | ............ | B60K 35/22 340/439 |

(Continued)

FOREIGN PATENT DOCUMENTS

| | | |
|---|---|---|
| CN | 207106344 U | 3/2018 |
| CN | 110745072 B | 6/2022 |

(Continued)

OTHER PUBLICATIONS

Extended European Search Report from EP Application No. 25192252.2 dated Dec. 22, 2025.

*Primary Examiner* — Muhammad Adnan
(74) *Attorney, Agent, or Firm* — Calfee, Halter & Griswold LLP

(57) ABSTRACT

A vehicle distance reminder system, a vehicle distance reminder method, a storage medium, and a vehicle are provided. The vehicle distance reminder system includes: a distance detection unit configured to detect a relative distance between a target vehicle and the ego vehicle, where the target vehicle is located directly behind or laterally behind the ego vehicle; a display screen configured to display an image of the target vehicle and an image of the ego vehicle, where the display screen is provided with a cursor, the cursor is used to reflect the relative distance, and the cursor is able to move within a target area of the display screen, and a color value of the cursor changes in response to a motion of the cursor.

18 Claims, 5 Drawing Sheets

(56) References Cited

U.S. PATENT DOCUMENTS

| | | | | |
|---|---|---|---|---|
| 2016/0191886 | A1* | 6/2016 | Tanabe | B60R 1/24<br>386/240 |
| 2019/0329793 | A1* | 10/2019 | Schwabe | B60K 35/10 |
| 2021/0001783 | A1* | 1/2021 | Lee | B60R 1/26 |

FOREIGN PATENT DOCUMENTS

| | | | |
|---|---|---|---|
| DE | 102011085426 | A1 | 5/2012 |
| DE | 102018004573 | A1 | 11/2018 |
| DE | 102019218741 | A1 | 6/2021 |
| JP | 2010092171 | A | 4/2010 |
| JP | 5985369 | B2 | 9/2016 |

* cited by examiner

VEHICLE DISTANCE REMINDER SYSTEM, VEHICLE DISTANCE REMINDER METHOD, STORAGE MEDIUM, AND VEHICLE

CROSS-REFERENCE TO RELATED APPLICATION(S)

The present disclosure is filed based on Chinese Patent Application with the application No. 202411059829.9, filed on Aug. 2, 2024, and claims priority to the Chinese Patent Application, the entire content of the Chinese Patent Application is incorporated herein by reference.

TECHNICAL FIELD

The present disclosure relates to the technical field of vehicle, and in particular, to a vehicle distance reminder system, a vehicle distance reminder method, a storage medium, and a vehicle.

BACKGROUND

In order to assist driving of vehicles, a vehicle may utilize various sensors installed in the vehicle via an advanced driving assistance system (ADAS) to sense the surrounding environment at any time during a driving process of the vehicle. By collecting data, a distance between a vehicle from the rear or side and an ego vehicle may be detected.

SUMMARY

In a first aspect, a vehicle distance reminder system is provided in the present disclosure, which is applied to a display device of a vehicle. The system includes: a distance detection unit configured to detect a relative distance between a target vehicle and an ego vehicle, where the target vehicle is located directly behind or laterally behind the ego vehicle; a display screen configured to display an image of the target vehicle and an image of the ego vehicle; where the display screen is provided with a cursor, the cursor is used to reflect the relative distance, and cursor is able to move within a target area of the display screen, and a color value of the cursor changes in response to a motion of the cursor.

In an implementation, a position and/or a color value of the cursor in the target area are related to the relative distance.

In an implementation, the position of the cursor is determined according to a length of the relative distance, where the shorter the relative distance is, the shorter a distance between the position of the cursor and the image of the ego vehicle is; the longer the relative distance is, the longer the distance between the position of the cursor and the image of the ego vehicle is.

In an implementation, a motion distance of the cursor in the target area is proportional to a change value of the relative distance between the target vehicle and the ego vehicle.

In an implementation, the color value of the cursor in the target area is inversely proportional to the change value of the relative distance.

In an implementation, a ratio of a change value of a motion distance and/or a change value of the color value of the cursor in the target area to the change value of the relative distance is a preset ratio.

In an implementation, the display screen is specifically configured to display the image of the target vehicle, the image of the ego vehicle, and the cursor in response to that the relative distance is shorter than or equal to a preset distance.

In an implementation, the display device is an electronic rearview mirror, the target area is a bar-shaped area, and the target area is located on an edge side of the display device.

In a second aspect, a vehicle distance reminder method is provided, which is applied to a display device of a vehicle. A display area of the display device is provided with a cursor, and the method includes: detecting a relative distance between a target vehicle and the ego vehicle, where the target vehicle is located directly behind or laterally behind the ego vehicle; and controlling a change of a motion distance and/or a change of a color value of the cursor within a target area according to the relative distance.

In a third aspect, a computer-readable storage medium is provided, and instructions are stored on the computer-readable storage medium, in response to that a computer executes the instructions, the computer performs the vehicle distance reminder method according to the second aspect.

In a fourth aspect, a vehicle is provided, which includes the vehicle distance reminder system provided in the first aspect.

In a fifth aspect, an electronic device is provided, which includes: a processor and a communication interface; the communication interface is coupled with the processor, and the processor is configured to run computer programs or instructions to implement the vehicle distance reminder method according to the second aspect.

In a sixth aspect, a computer program product is provided. The computer program product includes computer instructions, upon the computer instructions are executed on an electronic device, the electronic device performs the vehicle distance reminder method according to the second aspect.

These and other aspects of the present disclosure may become more apparent from the following description.

BRIEF DESCRIPTION OF THE DRAWINGS

In order to illustrate technical solutions in the embodiments of the present disclosure more clearly, the accompanying drawings needed to be used in descriptions for the embodiments will be introduced briefly. Obviously, the described accompanying drawings below are merely accompanying drawings of some embodiments of the present disclosure, and for a person of ordinary skill in the art may obtain other accompanying drawings according to these accompanying drawings without paying any creative effort.

DETAILED DESCRIPTION

Figure 1:
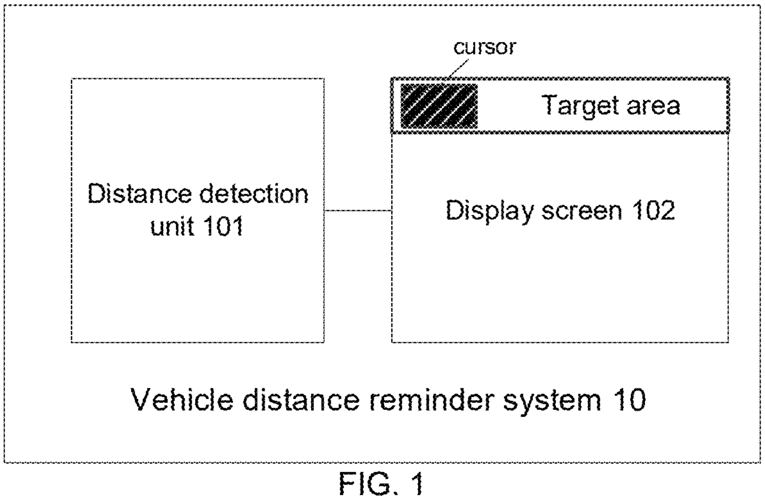
FIG. 1 is a schematic diagram of a vehicle distance reminder system according to an exemplary embodiment.

The technical solutions in the embodiments of the present disclosure will be described below clearly and completely in conjunction with the accompanying drawings. Obviously, the described embodiments are merely a part of the embodiments of the present disclosure, but not all of the embodiments of the present disclosure. All other embodiments obtained according to the embodiments of the present disclosure by those of ordinary skill in the art without paying any creative effort shall be included in the protection scope of the present disclosure.

It should be noted that terms such as "first" and "second", etc., in the specification, claims and the above-mentioned accompanying drawings of the present disclosure are used for distinguishing similar objects, but not necessarily used for describing a specific sequence or a precedence order. It should be understood that the terms so used are interchangeable under appropriate circumstances such that the embodiments of the present disclosure described herein are capable of being practiced in sequences in addition to those illustrated or described herein. The implementations described in the following exemplary embodiments do not represent all implementations consistent with the present disclosure. Rather, they are merely examples of apparatus and methods consistent with some aspects of the embodiments of the present disclosure as described in detail in the appended claims.

It should also be understood that the term "comprise/include" and variations thereof indicate the presence of described features, integers, steps, operations, elements and/or components, but do not exclude the presence or addition of one or more other features, integers, steps, operations, elements and/or components.

Before providing a detailed introduction to a vehicle distance reminder system provided in the present disclosure, a brief introduction will be given to an application scenario and an implementation environment involved in the present disclosure.

First, a brief introduction will be given to the application scenario involved in the present disclosure.

ADAS system is an active safety technology that utilizes various sensors installed on the vehicle to collect environmental data inside and outside the vehicle, and performs technical processing such as identification, detection, and tracking for static and dynamic objects, so as to enable a driver to notice possible dangers in the shortest possible time, thus attracting attention and improving the safety.

The ADAS system includes a rearview camera system. Based on the rearview camera system, the ADAS system may sense the surrounding environment at any time during the driving process of the vehicle. By collecting data, a distance between another vehicle from the rear or side and an ego vehicle may be detected.

However, in a case where the visibility is poor at night or in a case where a high beam of a vehicle from the rear is on, a driver of the vehicle cannot accurately determine a distance between the vehicle and another vehicle from the rear through a rearview mirror, which brings a significant safety hazard for driving.

In order to solve the above problems, a vehicle distance reminder system is provided in the embodiments of the present disclosure, which is applied to a display device of a vehicle. The vehicle distance reminder system may reflect a relative distance between the ego vehicle and a vehicle behind the ego vehicle by a motion and/or a change of a color value of a cursor provided in a display area of the display device. In this way, the vehicle distance reminder system provided in the present disclosure may make abstract data be visualized by converting the collected distance information into visible cursor information for a driver, thus better reminding the driver about the distance information between a vehicle behind the ego vehicle and the ego vehicle. In this way, the driver may accurately understand the distance between the vehicle behind the ego vehicle and the ego vehicle based on the change of the cursor.

In an application scenario, in response to detecting that a light intensity in an environment where the vehicle is located is lower than a preset intensity, the vehicle may automatically activate the vehicle distance reminder system provided in the present disclosure. For example, in a case where the vehicle passes through a tunnel, the vehicle may activate the vehicle distance reminder system provided in the present disclosure. As another example, during a rainy day or at night, the vehicle may activate the vehicle distance reminder system provided in the present disclosure in a driving process of the vehicle.

In another application scenario, the vehicle may activate the vehicle distance reminder system in response to an activation instruction from a driver.

The vehicle distance reminder system of the embodiments of the present disclosure may be introduced below in conjunction with the accompanying drawings.

FIG. 1 is a schematic diagram of a vehicle distance reminder system provided in the embodiments of the present disclosure. The distance reminder system may be applied to a display device of a vehicle. The display device may be an electronic rearview mirror of the vehicle. As shown in FIG. 1, the vehicle distance reminder system 10 may include a distance detection unit 101 and a display screen 102. The distance detection unit 101 is in a communication connection with the display screen 102, for example, they may be connected with each other through a system bus.

Herein, the distance detection unit 101 is configured to detect a relative distance between a target vehicle and the ego vehicle, where the target vehicle is located directly behind or laterally behind the ego vehicle. For example, the distance detection unit 101 may be a millimeter wave radar, distance sensor, or other distance detection device.

The display screen 102 is used to display an image of the target vehicle and an image of the ego vehicle.

In one implementation, in a case where the relative distance between the ego vehicle and the target vehicle is shorter than or equal to a preset distance, the display screen 102 may display the image of the target vehicle, the image of the ego vehicle, and a cursor. Herein, the preset distance may be set as needed, for example, the preset distance may be 50 meters (m), 60 meters, etc., which is not limited herein.

In the present disclosure, the display screen is provided with a cursor, and the cursor is able to move within a target area of the display screen, and a color value of the cursor changes in response to a motion of the cursor.

Herein, a position and/or color value of the cursor in the target area are related to the relative distance. The target area may be referred to as a reminder area, and the cursor may move within the target area based on a distance between the target vehicle and the ego vehicle, and/or the color value of the cursor within the target area may change based on a change of the distance between the target vehicle and the ego vehicle.

In one implementation, the position of the cursor in the target area being related to the relative distance includes: the position of the cursor being determined according to a length of the relative distance. Herein, the shorter the relative distance between the ego vehicle and a vehicle behind the ego vehicle is, the shorter a distance between the position of the cursor and the image of the ego vehicle is; the longer the relative distance is, the longer the distance between the position of the cursor and the image of the ego vehicle is. In this way, a driver may accurately learn the distance between the distance between the vehicle behind the ego vehicle and the ego vehicle based on a change of the distance between the cursor and the image of the ego vehicle.

In another implementation, the position of the cursor in the target area being related to the relative distance between the target vehicle and the ego vehicle includes: a motion distance of the cursor in the target area being proportional to a change value of the relative distance between the target vehicle and the ego vehicle.

In one example, the motion distance of the cursor and the change value of the relative distance between the target vehicle and the ego vehicle satisfy a formula 1:

$$M_g = M_c * k_1 \quad \text{Formula 1}$$

where $M_c$ represents a change value of the relative distance between the target vehicle and the ego vehicle, $M_g$ represents a motion distance of the cursor, $k_1$ represents a conversion coefficient between the change value of the relative distance and the motion distance of the cursor.

Figure 2:
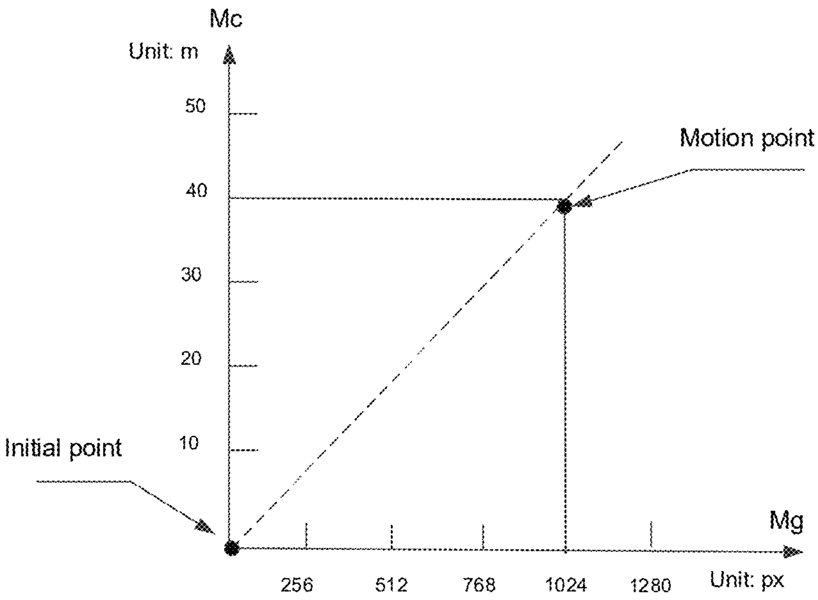
FIG. 2 is a schematic diagram of a conversion coefficient according to an exemplary embodiment.

In one example, as shown in FIG. 2, taking a detection distance of the distance detection unit 101 as 50 m and a resolution of the display screen as 1280*720 as an example, it is assumed that a length of the target area is consistent with a length of the display screen (i.e., the length of the target area is 1280 pixels), and the conversion coefficient $k_1$ is 25.6. An initial point is used to identify a position of the target vehicle detected at a first time, a motion point is used to represents a motion position of the target vehicle, and a slope of the dashed line is equal to the conversion coefficient $k_1$. That is, for every 1 m decrease in the relative distance between the target vehicle and the ego vehicle, the motion distance of the cursor is 25.6 px; for every 1m increase in the relative distance between the target vehicle and the ego vehicle, the motion distance of the cursor increases by 25.6 px.

It should be understood that in practical applications, due to a difference between the detection distance of the distance detection unit 101 and the resolution of the electronic rearview mirror, the conversion coefficient $k_1$ may vary depending on different settings of different vehicles. But for the same vehicle, a device configuration is already fixed, then a coefficient of the vehicle is a fixed value. Therefore, after the conversion coefficient $k_1$ is acquired, the distance detection unit 101 may directly use the conversion coefficient $k_1$ without performing further calculation after detecting the relative distance between the target vehicle and the ego vehicle.

In one implementation, the color value of the cursor in the target area being related to the relative distance includes: the color value of the cursor in the target area being inversely proportional to a change value of the relative distance.

In one example, the color value of the cursor and the change value of the relative distance between the target vehicle and the ego vehicle satisfy formula 2:

$$C_g = 250 - M_c * k_2 \quad \text{Formula 2}$$

where $C_g$ represents a G color value of a red-green-blue (RGB) value of the color value of the cursor, and $k_2$ represents a conversion coefficient between the change value of the relative distance and the color value of the cursor.

In one example, taking a change range of the G color value $C_g$ of the RGB value of the color value of the cursor is 250-0, and a maximum detection distance is 50 m as an example, where the maximum detection distance is a maximum distance that the distance detection unit 101 is able to detect.

The cursor changes within the target area of the electronic rearview mirror. When the relative distance between the target vehicle and the ego vehicle reaches the maximum detection distance, the color value of the cursor is yellow, and a RGB value of the cursor is (255, 250, 0). When the relative distance between the target vehicle and the ego vehicle is a minimum vehicle distance, the color value of the cursor is red, and the RGB value of the cursor is (255, 0, 0). Herein, the minimum vehicle distance is a minimum relative distance at which no collision occurs between the target vehicle and the ego vehicle.

As can be seen from the above, within a range between the minimum vehicle distance and the maximum detection distance, for every 1m increase or decrease in the change value of the relative distance between the target vehicle and the ego vehicle, the corresponding G color value $C_g$ of the RGB value of the corresponding color value of the cursor decreases or increases by 5, that is, the conversion coefficient $k_2$ between the change value of the relative distance and the G value of the RGB value of the color value of the cursor is 5.

For example, for every 1 m decrease in the relative distance between the target vehicle and the ego vehicle, that is, a change value of the relative distance between the target vehicle and the ego vehicle is (+1) meter, then the G color value corresponding to the RGB value of the color value of the cursor decreases by 5.

In one implementation, a ratio of a change value of the motion distance and/or a change value of the color value of the cursor in the target area to the change value of the relative distance is a preset ratio.

In one example, the ratio of the change value of the motion distance of the cursor in the target area to the change value of the relative distance is the conversion coefficient $k_1$. For example, the conversion coefficient $k_1$ may be 25.6, that is, for every 1 m increase or decrease in the change vale of the relative distance, the motion distance of the cursor in the target area increases or decreases by 25.6 px.

In another example, the ratio of the change value of the color value of the cursor in the target area to the change value of the relative distance is the conversion coefficient $k_2$. For example, the conversion coefficient $k_2$ may be 5, that is, for every 1m increase or decrease in the change vale of the relative distance, the G color value corresponding to the RGB value of the color value of the cursor decreases or increases by 5.

In one implementation, the display screen 102 is specifically configured to display the image of the target vehicle, the image of the ego vehicle, and the cursor in a case where the relative distance is shorter than or equal to the preset distance.

In one example, when the relative distance is longer than the preset distance, the relative distance between the target vehicle and the ego vehicle is relatively far, and there is no collision risk between the target vehicle and the ego vehicle. At this time, the display screen 102 only displays the image of the ego vehicle.

In another example, when the relative distance is shorter than or equal to the preset distance, the display screen 102 displays the image of the target vehicle, the image of the ego vehicle and the cursor, and the position and color value of the cursor are determined according to the relative distance.

Herein, when the relative distance between the target vehicle and the ego vehicle is equal to the preset distance, the initial position of the cursor in the target area is a position farthest from the ego vehicle. As the relative distance between the target vehicle and the ego vehicle decreases, the position of the cursor gradually approaches the position of the image of the ego vehicle, and the color value of the cursor gradually changes from yellow to red.

In one implementation, the display device is an electronic rearview mirror, the target area is a bar-shaped area, and the target area is located on an edge side of the display device. For example, the target area may be located at an upper or lower edge of a display interface of the display device.

Figure 3:
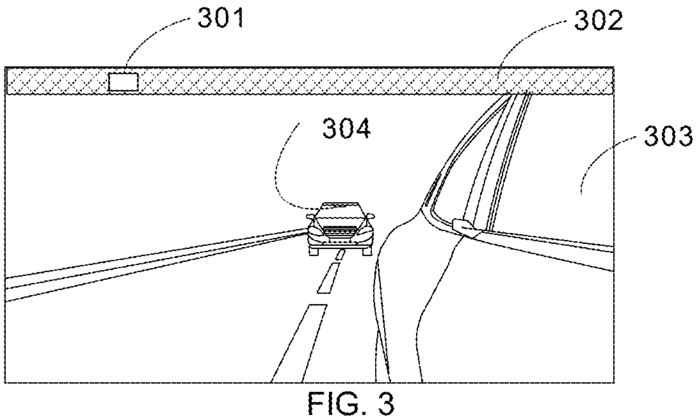
FIG. 3 is a schematic diagram of an interface of an electronic rearview mirror according to an exemplary embodiment.

In one example, as shown in FIG. 3, the target area 302 may be located at the upper edge of the display interface of the electronic rearview mirror, and the target area is the a motion area of the cursor. The cursor 301 may move within the target area.

In one example, when an image of the target vehicle 304 and an image of the ego vehicle 303 are displayed on an interface of the electronic rearview mirror, the cursor is displayed on the target area, and the position of the cursor is determined by a length of the relative distance. The shorter the relative distance is, the closer the cursor is to the image of the ego vehicle.

Figure 4:
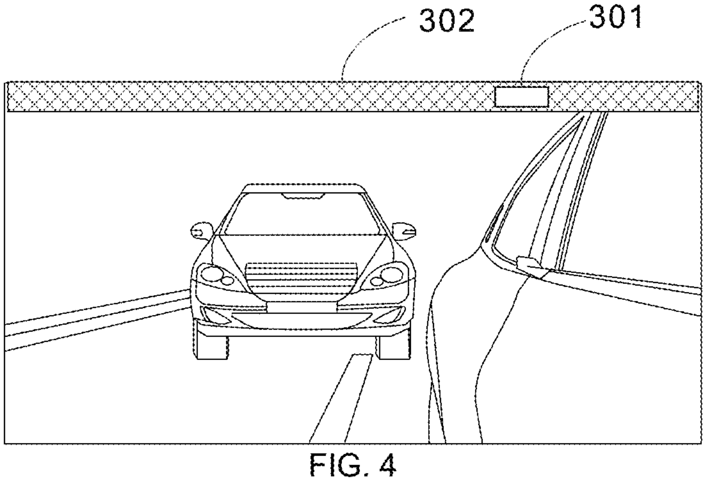
FIG. 4 is another schematic diagram of an interface of an electronic rearview mirror according to an exemplary embodiment.

In some embodiments, as shown in FIG. 4, as the relative distance between the target vehicle and the ego vehicle becoming shorter and shorter, the position of cursor 301 in the target area becomes closer and closer to the image of the ego vehicle, and the color value of cursor 301 becomes darker and darker.

In one example, a driver may set a change of the color value of the cursor as needed, for example, the color value of the cursor may be set to gradually change from yellow to red, or may be set to gradually change from green to red.

Figure 5:
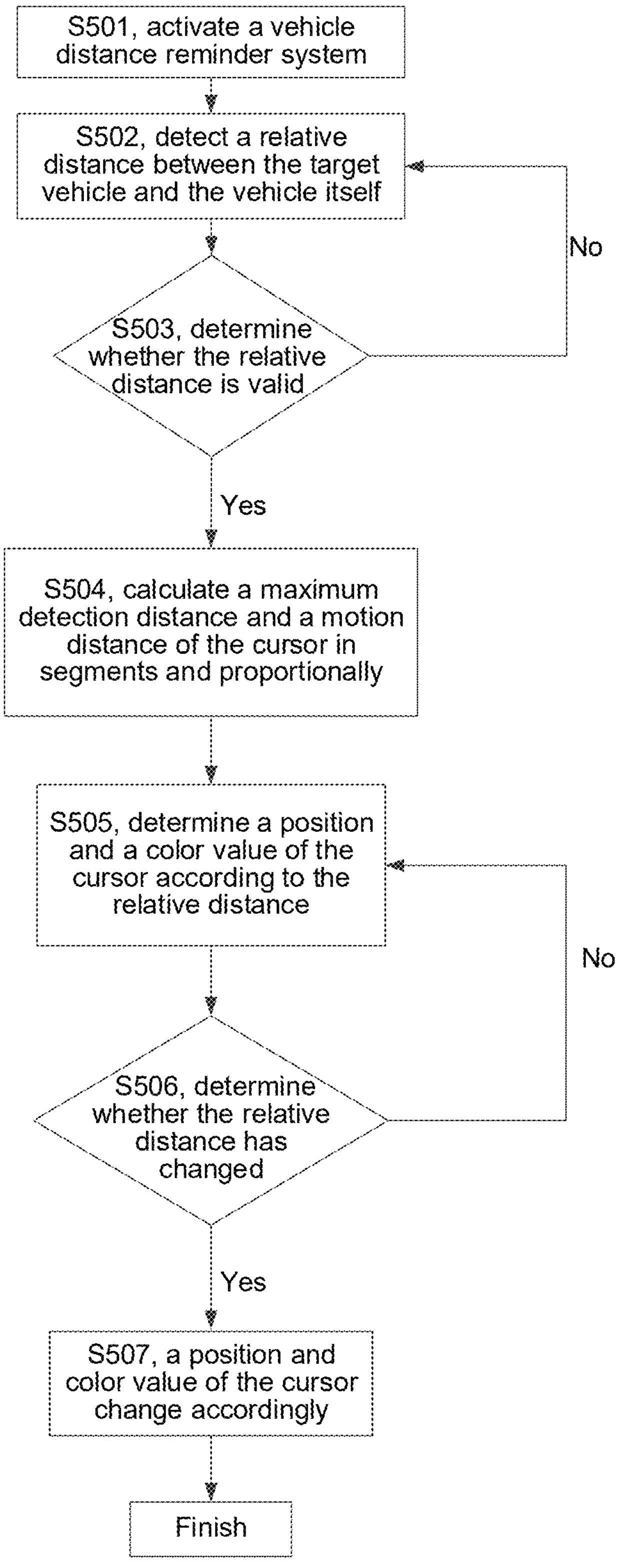
FIG. 5 is a flowchart of a vehicle distance reminder method according to an exemplary embodiment.

In some embodiments, as shown in FIG. 5, a flowchart of a vehicle distance reminder method is illustrated, which includes S501-S507.

In S501, a vehicle distance reminder system is activated.

In some embodiments, the vehicle distance reminder system 10 is activated in a case where the ego vehicle is activated.

In S502, a relative distance between the target vehicle and the ego vehicle is detected.

In some embodiments, after the vehicle distance reminder system 10 is activated, a first relative distance between the target vehicle and the ego vehicle is detected by the distance detection unit 101.

Herein, the first relative distance is a length of a relative distance detected by the distance detection unit 101 at an initial position, and the initial position is a position where the target vehicle is first detected by the distance detection unit 101 within a detection range.

In S503, whether the relative distance is valid is determined.

In some embodiments, the detected first relative distance is compared with a maximum detection distance that the distance detection unit 101 can detect. If the first relative distance is shorter than or equal to the maximum detection distance, the first relative distance is valid, and the obtained first relative distance is provided for subsequent use. If the first relative distance is longer than the maximum detection distance, the first relative distance is invalid, and the distance detection unit 101 re-detects the relative distance between the target vehicle and the ego vehicle.

In S504, a maximum detection distance and a motion distance of the cursor are calculated in segments and proportionally.

In some embodiments, a fixed proportional relationship between the maximum detection distance and the motion distance of the cursor in the target area is calculated according to a situation that the maximum detection distance that the distance detection unit 101 can detect corresponds to the motion distance of the cursor in the target area.

In S505, a position and a color value of the cursor are determined according to the relative distance.

In some embodiments, the position and the color value of the cursor in the electronic rearview mirror are determined according to the first relative distance detected by the distance detection unit 101.

In one example, when the distance detection unit 101 detects the first relative distance, a change value of the relative distance may be regarded as a difference between the first relative distance and the maximum detection distance of the distance detection unit 101. The position of the cursor is determined based on a conversion coefficient $k_1$ between the change value of the relative distance and a motion value of coordinate positions of the cursor and the formula 1. The color value of the cursor is determined based on a conversion coefficient $k_2$ between the change value of the relative distance and a change value of the color value of the cursor and the formula 2.

In S506, whether the relative distance has changed is determined.

In some embodiments, whether the relative distance has changed is determined by comparing a second relative distance detected by the distance detection unit 101 with the first relative distance.

Herein, the second relative distance is a relative distance detected by the distance detection unit 101 at a current moment.

In S507, if the relative distance has changed, a position and color value of the cursor may change accordingly.

In some embodiments, if the relative distance changes, the position and color value of the cursor also change accordingly. If the relative distance has not changed, the position and color value of the cursor may continue to be determined according to the relative distance.

Figure 6:
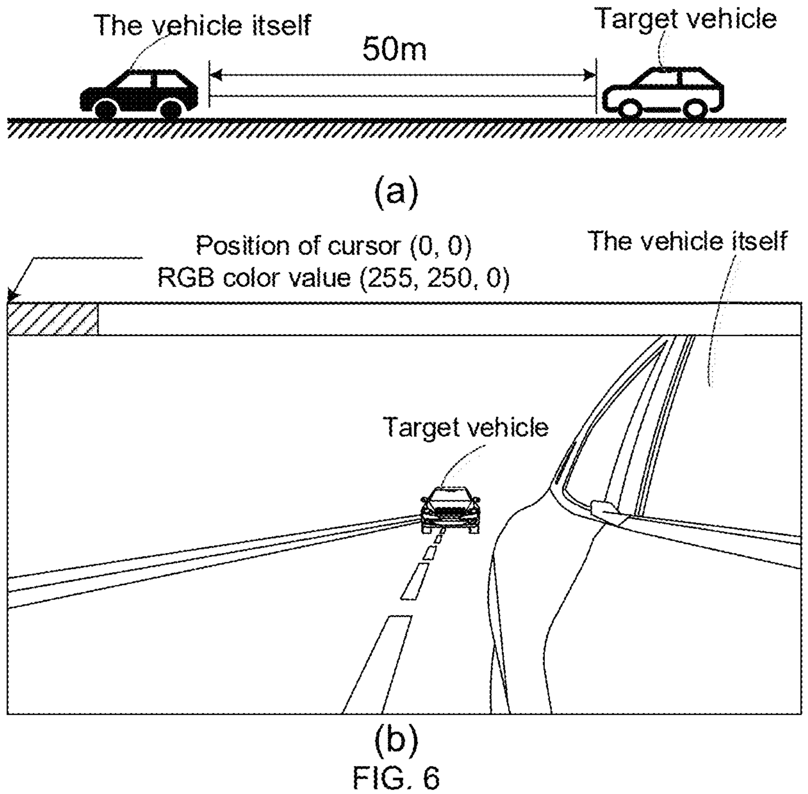
FIG. 6 is a schematic diagram of a portion and a color value of a cursor corresponding to a position of a target vehicle according to an exemplary embodiment.
Figure 7:
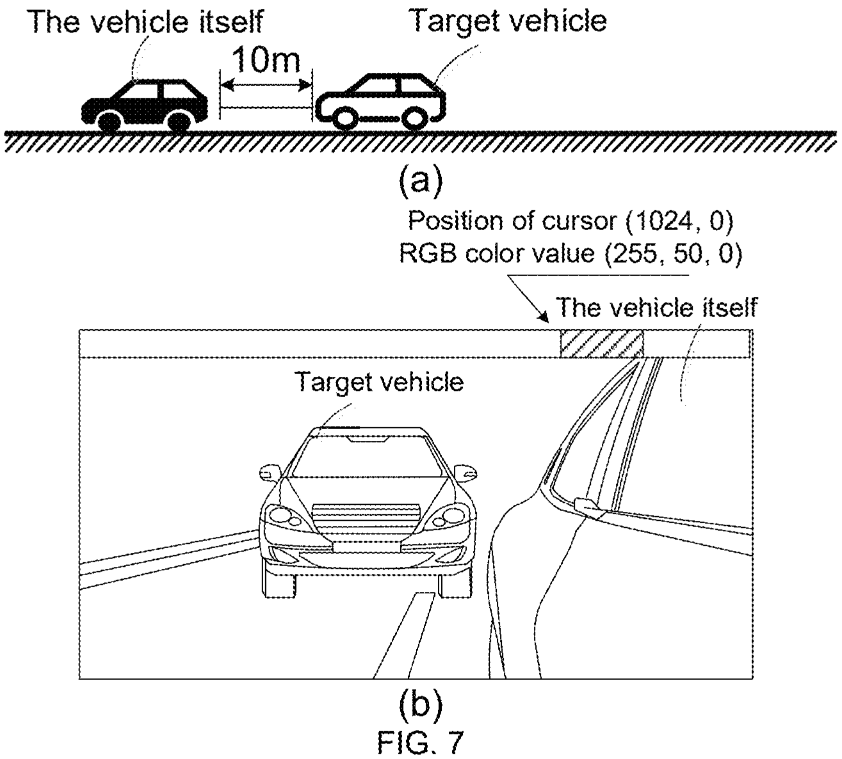
FIG. 7 is another schematic diagram of a portion and a color value of a cursor corresponding to a position of a target vehicle according to an exemplary embodiment.

In one example, as shown in a part (a) of FIG. 6, the relative distance between the target vehicle and the ego vehicle is 50 m. As shown in part (b) of FIG. 6, a detected initial position of the target vehicle is taken as an initial point, that is, a position of the cursor is (0,0). As shown in part (a) of FIG. 7, the relative distance between the target vehicle and the ego vehicle is 10m. Taking the ego vehicle as a coordinate system, when the target vehicle moves with a length of 40m towards the ego vehicle, the distance detection unit 101 detects that a change value of the relative distance is (+40m). According to formula 1, as shown in part (b) of FIG. 7, the vehicle distance reminder system 10 may determine that a motion value of the cursor at this time is 1024 px, which means the position of the cursor at this time is (1024, 0).

In another example, as shown in part (b) of FIG. 6, the detected initial position of the target vehicle is taken as the initial point, that is, the cursor is located at the initial point, and a RGB color value of the cursor is (255, 250, 0) at the initial point. As shown in part (b) of FIG. 7, taking the ego vehicle as the coordinate system, the target vehicle moves with a length of 40m towards the ego vehicle, the distance detection unit 101 detects that a change value of the relative distance is (+40m). According to formula 2, the vehicle distance reminder system 10 may determine that a G value of the RGB value of the color value of the cursor is 50, which means that the RGB value of the cursor at this time is (255, 50, 0).

It should be noted that the distance detection unit 101 may detect the relative distance between the target vehicle and the ego vehicle in real time, and adjust a corresponding position coordinate and color value of the cursor accordingly.

Herein, a specific implementation methods of S501 to S507 may refer to the description for the above-mentioned embodiments, which may not be repeated herein.

According to the above-mentioned technical solutions, the relative distance between the target vehicle and the ego vehicle is detected according to the distance detection unit 101 in the vehicle distance reminder system 10. A coordinate position and color value of the cursor are determined based on the relative distance and conversion coefficients $k_1$ and $k_2$. Based on this, relative distance parameters detected by the distance detection device 101 may be converted into a visible cursor for the driver, making abstract data concrete, thus reminding a user more accurately about distance information of an incoming vehicle located directly behind or laterally behind the ego vehicle.

In some embodiments, the above technical solutions are mainly based on an example of using an electronic rearview mirror as a right rearview mirror. Due to the fact that there are two electronic rearview mirrors in the vehicle, control methods for both left and right rearview mirrors are the same, only motion directions of cursors are opposite.

For example, when the electronic rearview mirror is a right rearview mirror, when the relative distance between the target vehicle and the ego vehicle gradually decreases, the cursor is located in the target area above the right rearview mirror, and is moving from a position closest to a direction of the image of the ego vehicle to a right side. Correspondingly, when the electronic rearview mirror is a left rearview mirror, when the relative distance between the target vehicle and the ego vehicle gradually decreases, the cursor is located in the target area above the left rearview mirror, and is moving from a position closest to a direction of the image of the ego vehicle to a left side.

In some embodiments, when there are multiple vehicles directly behind or laterally behind the ego vehicle, a vehicle closest to the ego vehicle that can be detected by the distance detection unit 101 is selected as the target vehicle, and a relative distance between the target vehicle and the ego vehicle is detected, and the relative distance is matched with the coordinate position and color value parameters of the cursor.

For example, when the ego vehicle is in a driven state, there is a vehicle located 20 m behind the ego vehicle, the vehicle 20 m behind the ego vehicle is taken as a first target vehicle. There is another vehicle located 40 m behind the ego vehicle, the vehicle 40 m behind the ego vehicle is taken as a second target vehicle. In this way, the first target vehicle detected by the distance detection unit 101 that is closest to the ego vehicle is taken as the target vehicle, and a relative distance between the first target vehicle and the ego vehicle is detected, and the detected relative distance is matched with the coordinate position and color value parameters of the cursor.

In some embodiments, when multiple vehicles appear directly behind or laterally behind the ego vehicle, and an overtaking behavior occurs between the multiple vehicles, the distance detection unit 101 takes a vehicle closest to the ego vehicle that can be detected as the target vehicle, and the target vehicle is a vehicle directly behind or laterally behind the ego vehicle, and closest to the ego vehicle after overtaking.

The solutions provided in the embodiments of the present disclosure are introduced above from the perspective of methods. In order to implement the above functions, corresponding hardware structures and/or software modules for performing various functions are included in the vehicle distance reminder system or electronic device. Those skilled in the art should easily realize that the present disclosure can be implemented in the form of hardware or a combination of hardware and computer software in combination with units and algorithm steps of examples described in the embodiments disclosed by the description. Whether a certain function is implemented by hardware or by computer software driving hardware depends on the specific application and design constraint conditions of the technical solutions. A skilled person may use different methods for each specific application, to implement the described functions, but such implementation should not be considered beyond the scope of the present disclosure.

In the embodiments of the present disclosure, the vehicle distance reminder system or electronic device may exemplarily be divided into functional modules according to the above method. For example, the vehicle distance reminder system or electronic device may include various functional modules corresponding to various divided functions, or two or more functions may be integrated into one processing module. The above-mentioned integrated module may be implemented in the form of hardware, or may be implemented in the form of software functional module. It should be noted that the division of the modules in the embodiments of the present disclosure is illustrated, which is only a logical functional division, and there may be other division manners in an actual implementation.

Figure 8:
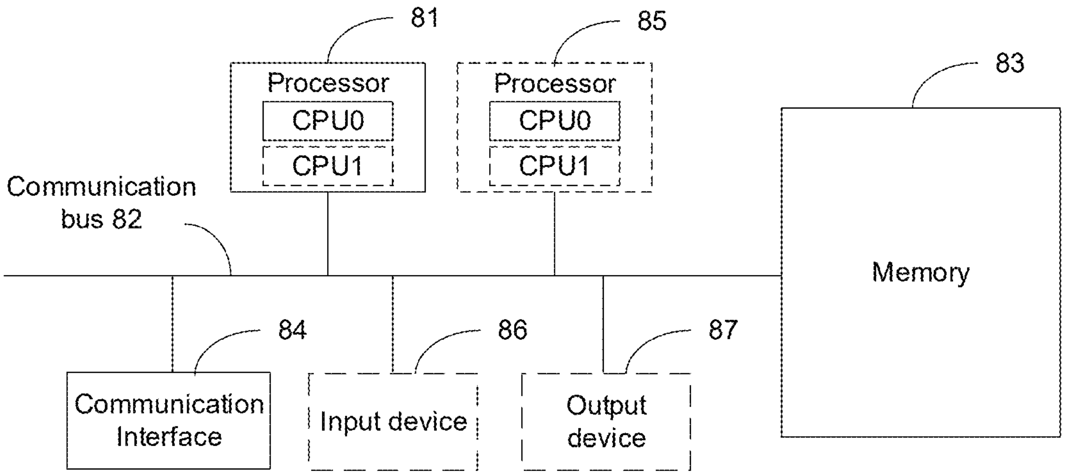
FIG. 8 is a schematic diagram of a structure of an electronic device according to an exemplary embodiment.

In a case where the functions of the above-mentioned integrated modules are implemented in the form of hardware, a schematic diagram of a structure of a electronic device involved in the above-mentioned embodiments is provided in the embodiments of the present disclosure. As shown in FIG. 8, the electronic device includes a processor 81, a communication bus 82, and a memory 83. The processor 81 and the memory 83 may be connected with each other through the communication bus 82.

The processor 81 is a control center of a communication apparatus, which may be a single processor, or may also be a general term of multiple processing elements. For example, the processor 81 may be a general-purpose central processing unit (CPU), or may also be other general-purpose processors. Herein, a general-purpose processor may be a microprocessor or any conventional processor.

In a specific implementation, as an embodiment, the processor 81 may include one or more CPUs, such as CPU 0 and CPU 1 shown in FIG. 8.

In a specific implementation, as an embodiment, a terminal may include multiple processors, such as a processor 81 and a processor 85 in FIG. 8. Each of these processors may be a single-CPU processor or a multi-CPU processor. The processor mentioned herein may refer to one or more devices, circuits, and/or processing cores configured to process data (such as computer program instructions).

The memory 83 may be a read-only memory (ROM) or other types of static storage devices that is able to store static information and instructions, may be a random access memory (RAM) or other types of dynamic storage devices that is able to store information and instructions, or may be an electrically erasable programmable read-only memory (EEPROM), a compact disc read-only memory (CD-ROM) or other optical disk storage, optical disc storage (including a compressed optical disc, a laser disc, an optical disc, a digital versatile disc, a Blu-ray disc, etc.), a magnetic disk storage medium or other magnetic storage devices, or any other media that is able to be used to carry or store desired program code in the form of instructions or data structures and is able to be accessed by a computer, which are not limited thereto. The memory may exist independently, and may be connected to a processing unit through a bus. The memory may also be integrated with the processing unit.

As an implementation, the memory 83 may exist independently from the processor 81, and the memory 81 may be connected to the processor 81 through the communication bus 82 for storing instructions or program codes. When the processor 81 invokes and executes instructions or program codes stored in the memory 83, the processor 81 may implement the vehicle distance reminder system provided in the embodiments of the present disclosure.

In another implementation, the memory 83 may also be integrated with the processor 81.

The communication bus 82 may be an industry standard architecture (ISA) bus, a peripheral component interconnect (PCI) bus, or an extended industry standard architecture (EISA) bus, etc. The bus may be classified as an address bus, a data bus, a control bus, etc. For ease of representation, only one bold line is used in FIG. 8 for representing the bus 82, but it does not mean that there is only one bus or one type of bus.

In a specific implementation, as an embodiment, the electronic device may further include an input device 86 and an output device 87. The input device 86 communicates with the output device 87, and may accept user input in various ways. For example, input device 86 may be a mouse, a keyboard, a touch screen device, or a sensing device, etc. The output device 87 communicates with the processor 81, and may display information in various ways. For example, the output device 87 may be a liquid crystal display (LCD), a light emitting diode (LED) display device, etc.

It should be pointed out that the structure shown in FIG. 8 does not constitute a limitation on the electronic device. In addition to the components shown in FIG. 8, the electronic device may include more or fewer components than those illustrated in figures, or certain components may be combined, or the component may be arranged in different ways.

Optionally, the electronic device provided in the embodiments of the present disclosure may further include a communication interface 84.

The communication interface 84 is configured to connect with other devices through a communication network. The communication network may be the Ethernet, a wireless access network, a wireless local area network (WLAN), or the like.

In one design, the communication interface may also be integrated into the processor in the electronic device provided in the embodiments of the present disclosure.

In another hardware structure of the electronic device provided in the embodiments of the present disclosure, the electronic device may include a processor and a communication interface. The processor is coupled to the communication interface.

The functions of the processor may refer to the description of the processor mentioned above. In addition, the processor also has a storage function, which may refer to the function of the above-mentioned memory.

The communication interface is configured to provide data to the processor. The communication interface may be an internal interface of the communication apparatus or an external interface of the communication apparatus.

It should be pointed out that another hardware structure mentioned above does not constitute a limitation on the electronic device. In addition to the another hardware components mentioned above, the electronic device may include more or fewer components, or certain components may be combined, or the components may be arranged in different ways.

In the case of implementing the functions of the integrated modules in the form of hardware, the schematic diagram of a structure of middle components involved in the above-mentioned embodiments is provided in the embodiments of the present disclosure, which may refer to the schematic diagram of the above-mentioned execution machine.

In the case of implementing the functions of the integrated modules in the form of hardware, the schematic diagram of a structure of the electronic device involved in the above-mentioned embodiments is provided in the embodiments of the present disclosure, which may refer to the description for the electronic device and is not repeated herein.

A vehicle is further provided in the embodiments of the present disclosure, which includes the above-mentioned vehicle distance reminder system 10 and the above-mentioned electronic device.

A computer-readable storage medium is further provided in the embodiments of the present disclosure, and the computer-readable storage medium stores instructions. When a computer executes the instructions, the computer performs the vehicle distance reminder method shown in the above method embodiments.

A computer program product including instructions is further provided in the embodiments of the present disclosure, when the instructions are executed on a computer, the computer is enabled to perform the vehicle distance reminder method described in the above-mentioned method embodiments.

Herein, the computer-readable storage medium, for example, may be, but not limited to an electrical, magnetic, optical, electromagnetic, infrared, or semiconductor system, device, or any combination thereof. More specific examples (not a exhaustive list) of the computer-readable storage medium include: an electrical connection with one or more wires, a portable computer disk, and a hard drive, a random access memory (RAM), a read-only memory (ROM), an erasable programmable read only memory (EPROM), a register, a hard drive, a optical fiber, a compact disc read-only memory (CD-ROM), an optical storage assembly, a magnetic storage assembly, or computer-readable storage media combined by people mentioned above, or computer-readable storage media in any other form that are well-known in the field. An exemplary storage medium is coupled to a processor, enabling the processor to read information from and write information to the storage medium. Of course, the storage medium may also be a component of the processor. The processor and storage medium may be located in an application specific integrated circuit (ASIC). In the embodiments of the present disclosure, the computer-readable storage medium may be any tangible medium containing or storing programs, and the programs may be used by an instruction execution system, apparatus, or assembly, or used in combination with the instruction execution system, apparatus, or assembly.

Since the computer-readable storage medium in the embodiments of the present disclosure is able to be applied to the above system, the technical effects that can be obtained may also refer to the above method embodiments, which are not be repeated in the embodiments of the present disclosure.

The above descriptions are merely specific implementations of the present disclosure, but the protection scope of the present disclosure is not limited thereto, and any variations or replacements within the technical scope disclosed in the present disclosure shall fall within the protection scope of the present disclosure.

What is claimed is:

1. A vehicle distance reminder system, wherein the system is applied to a display device of a vehicle, and comprises:

a distance detection unit, configured to detect a relative distance between a target vehicle and an ego vehicle, wherein the target vehicle is located directly behind or laterally behind the ego vehicle;

a display screen, configured to display an image of the target vehicle and an image of the ego vehicle;

wherein the display screen is provided with a cursor, the cursor is used to reflect the relative distance, and the cursor is able to move within a target area of the display screen, and a color value of the cursor changes in response to a motion of the cursor; and the position of the cursor is determined according to a length of the relative distance, wherein the shorter the relative distance is, the shorter a distance between the position of the cursor and the image of the ego vehicle is; the longer the relative distance is, the longer the distance between the position of the cursor and the image of the ego vehicle is.

2. The system according to claim 1, wherein at least one of a position or a color value of the cursor in the target area is related to the relative distance.

3. The system according to claim 2, wherein the color value of the cursor in the target area is inversely proportional to a change value of the relative distance.

4. The system according to claim 2, wherein the color value of the cursor in the target area is inversely proportional to a change value of the relative distance.

5. The system according to claim 2, wherein a ratio of at least one of a change value of a motion distance or a change value of a color value of the cursor in the target area to a change value of the relative distance is a preset ratio.

6. The system according to claim 2, wherein a ratio of at least one of a change value of a motion distance or a change value of a color value of the cursor in the target area to a change value of the relative distance is a preset ratio.

7. The system according to claim 2, wherein the display screen is configured to display the image of the target vehicle, the image of the ego vehicle, and the cursor in response to that the relative distance is shorter than or equal to a preset distance.

8. The system according to claim 2, wherein the display screen is configured to display the image of the target vehicle, the image of the ego vehicle, and the cursor in response to that the relative distance is shorter than or equal to a preset distance.

9. The system according to claim 2, wherein a motion distance of the cursor in the target area is proportional to a change value of the relative distance between the target vehicle and the ego vehicle.

10. The system according to claim 9, wherein the color value of the cursor in the target area is inversely proportional to a change value of the relative distance.

11. The system according to claim 9, wherein a ratio of at least one of a change value of a motion distance or a change value of a color value of the cursor in the target area to a change value of the relative distance is a preset ratio.

12. The system according to claim 9, wherein the display screen is configured to display the image of the target vehicle, the image of the ego vehicle, and the cursor in response to that the relative distance is shorter than or equal to a preset distance.

13. The system according to claim 1, wherein a ratio of at least one of a change value of a motion distance or a change value of a color value of the cursor in the target area to a change value of the relative distance is a preset ratio.

14. The system according to claim 1, wherein the display screen is configured to display the image of the target vehicle, the image of the ego vehicle, and the cursor in response to that the relative distance is shorter than or equal to a preset distance.

15. The system according to claim 1, wherein the display device is an electronic rearview mirror, the target area is a bar-shaped area, and the target area is located on an edge side of the display device.

16. A vehicle, comprising a vehicle distance reminder system according to claim 1.

17. A vehicle distance reminder method, applied to a display device of a vehicle, wherein a display area of the display device is provided with a cursor, and the method comprises:

detecting a relative distance between a target vehicle and the ego vehicle, wherein the target vehicle is located directly behind or laterally behind the ego vehicle; and controlling at least one of a change of a motion distance or a change of a color value of the cursor within a target area according to the relative distance;

wherein the method further comprises:

determining the position of the cursor according to a length of the relative distance, wherein the shorter the relative distance is, the shorter a distance between the position of the cursor and the image of the ego vehicle is; the longer the relative distance is, the longer the distance between the position of the cursor and the image of the ego vehicle is.

18. A non-transitory computer-readable storage medium, wherein instructions are stored on the computer-readable storage medium, wherein a computer executes the instructions, the computer performs the vehicle distance reminder method according to claim 17.

* * * * *